United States Patent [19]

Kimber

[11] 4,389,746
[45] Jun. 28, 1983

[54] CONNECTOR FOR WINDSHIELD WIPERS OF LOW SILHOUETTE TYPE

[75] Inventor: Edward G. Kimber, Carlisle, Canada

[73] Assignee: Tridon Limited, Hamilton, Canada

[21] Appl. No.: 274,137

[22] Filed: Jun. 16, 1981

[51] Int. Cl.³ .......................................... B60S 1/40
[52] U.S. Cl. ............................... 15/250.32; 15/250.42
[58] Field of Search ......................... 15/250.32–250.42

[56] References Cited

U.S. PATENT DOCUMENTS

| | | | |
|---|---|---|---|
| 3,866,259 | 2/1975 | Nichols et al. | 15/250.32 |
| 3,875,611 | 4/1975 | Pliskey et al. | 15/250.32 |
| 4,244,077 | 1/1981 | Harbison et al. | 15/250.32 |

Primary Examiner—Peter Feldman
Attorney, Agent, or Firm—Hirons, Rogers & Scott

[57] ABSTRACT

A connector for windshield wipers of low silhouette type has a sideways-extending pin that is inserted into a cooperating transverse aperture in the wiper superstructure and is retained therein by a spring latch member engaging a circumferential groove. The latch member is of spring wire and has two spaced parallel arms joined at one end by a cross-member. Each arm consists of at least a connecting portion, a pin-engaging portion, a spring portion and a reaction or anchor portion in the order stated, the last two having a loop portion between them. The latch is inserted into a recess formed in the underside of the superstructure primary yoke, the loop portion passing between two columns until they can snap apart over the top of the columns. Each pin-engaging portion moves against two longitudinally-spaced side columns which control the engagement with the pin retaining shoulders, and both portions engage a transverse projection that controls the latch portion when the pin is absent. These columns facilitate the final proving required to match the wiper superstructure to the latch. The cross-member moves in a topside counter-recess connected to the main recess by a narrow aperture through which the connecting portions pass, so that the material of the spring latch cannot be overstressed.

18 Claims, 7 Drawing Figures

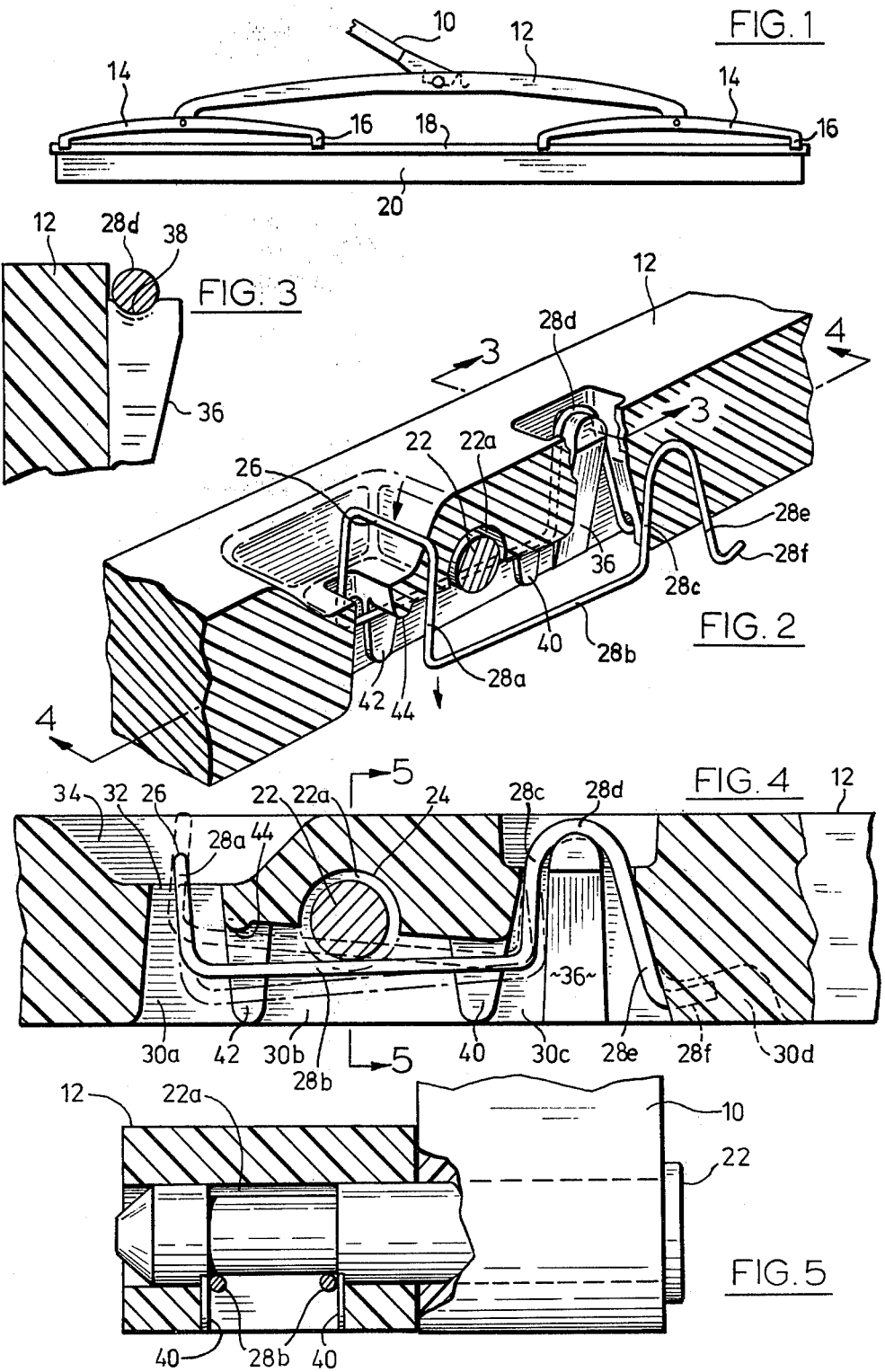

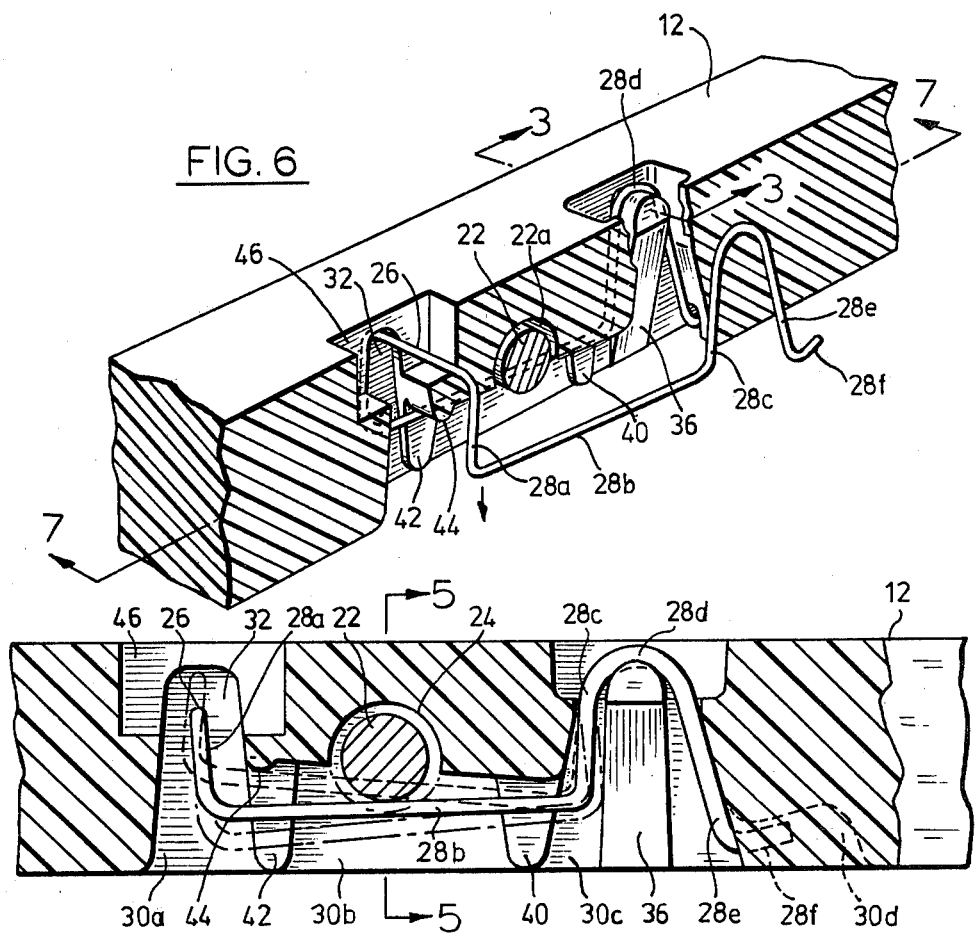

CONNECTOR FOR WINDSHIELD WIPERS OF LOW SILHOUETTE TYPE

FIELD OF THE INVENTION

This invention is concerned with improvements in or relating to windshield wipers, and especially to windshield wiper connectors of the type wherein a wiper arm has a sideways-extending pin that enters a cooperating transverse aperture in the wiper superstructure and is releasably retained therein by a connector latch member.

REVIEW OF THE PRIOR ART

Windshield wipers of low silhouette type are now well established in the industry, such wipers almost universally employing a connector between the wiper arm and the superstructure wherein a sideways-extending pin on the arm enters a cooperating transverse aperture in the wiper superstructure and is releasably latched therein by a spring latch member located in a recess in the superstructure. Cost is of course always a primary consideration in any industry and the usual pattern of design and development is first to produce as economically as possible a commercially-satisfactory device and, once the product incorporating the device is found to have a continuing market, expend further time and effort in producing new designs exhibiting significant cost reductions in their manufacture and assembly.

Wire spring latch or retainer members are now common and have proven to be very satisfactory, the most prevailing problem being the ease with which, in the absence of suitable stops or other constraints, the user can displace the movable part of the latch member beyond the elastic limit of the spring material, so that a member is permanently bent and no longer effective. There is therefor a need to provide such a stop or constraint in some manner. When attempting cost reduction there is a practical lower limit to the thickness of wire that can be used, and the cost reduction to be obtained by shortening the length of the wire is trivial. Further development must therefore be directed to the shape of the latch member, and of the recess in which it is located, to facilitate its performance and/or the ease and cost of manufacture and assembly.

DEFINITION OF THE INVENTION

It is therefore an object of the invention to provide a new connector for windshield wipers of low silhouette type employing a wire spring latch or retainer member, which is inhereently protected against displacement by a user beyond the elastic limit of the material employed.

It is another object to provide such a connector having advantages in manufacture and assembly over prior art structures.

In accordance with the present invention there is provided a windshield wiper comprising:

a pressure distributing superstructure having at least a yoke member thereof of moulded plastic material;

wherein a releasable connector between the superstructure and a wiper arm includes a pin extending sideways from the wiper arm and entering a cooperating transverse aperture in the said yoke member for the superstructure to pivot thereon;

the pin having a circumferential groove therein for releasable retaining engagement by a connector latch member mounted in a recess formed in the said yoke member;

a releasable connector wherein said recess receiving a connector latch member is moulded in the underside of the yoke member;

the said connector latch member being of spring wire material having two parallel transversely-spaced arms connected together at one end by a cross-member;

each arm comprising a number of arm portions connected together in the following order, namely, a connecting portion connected to the said cross-member and extending from the counter-recess through the reduced length aperture into the said underside recess, a pin-engaging portion connected to the connecting portion and extending lengthwise of the yoke member for releasable retaining engagement in the circumferential pin groove and for heightwise movement into and out of such engagement by corresponding movement of the cross-member and the connecting portion;

a spring portion extending heightwise of the yoke member and enabling the said movement of the pin-engaging portion;

and a spring reaction portion also extending heightwise of the yoke member and engaging a wall of the recess to provide reaction for the said heightwise movement of the pin-engaging portion.

In such a construction it may be provided that each pin-engaging portion engages a transverse projection extending lengthwise from the underside recess wall, the height of the projection determining the position of the cross-member in the said counter-recess in the absence of the pin from the cooperating transverse aperture.

Alternatively, or in addition, it may be provided that each pin-engaging portion engages in its heightwise movement in the recess two lengthwise spaced columns protruding widthwise into the recess, the columns being disposed on opposite sides of the said cooperating transverse aperture and the widthwise thickness thereof determining the engagement of the pin-engaging portions with the shoulders of the pin circumferential recess.

DESCRIPTION OF THE DRAWINGS

Particular preferred embodiments of the invention will now be described by way of example, with reference to the accompanying diagrammatic drawings, wherein:

FIG. 1 is a side elevation of a windshield wiper, showing in broken lines the location of the connector clip;

FIG. 2 is a perspective view of the central portion of the windshield wiper superstructure of a first embodiment shown broken away longitudinally to reveal the entire connector latch and its disposition;

FIG. 3 is a section on the line 3—3 of FIG. 2;

FIG. 4 is a section on the line 4—4 of FIG. 2;

FIG. 5 is a section of the line 5—5 of FIG. 4;

FIG. 6 is a view similar to FIG. 2 of a second embodiment; and

FIG. 7 is a cross-section on the line 7—7 of FIG. 6.

DESCRIPTION OF THE PREFERRED EMBODIMENT

A windshield wiper of a conventional type is shown diagrammatically in FIG. 1, and consists of a wiper arm 10 connected to a longitudinally-extending pressure-distributing superstructure which, by way of example only, is shown as consisting of a primary yoke member 12 pivotally connected at its ends to two secondary yoke members 14. The secondary yoke members are provided in known manner at their ends with retaining claws 16 which embrace the edges of a backing strip 18 carrying a wiper squeegee 20. The arm 10, is connected to the primary yoke by means of a sideways-extending pin 22 that is received with a close but free fit in a cooperating transverse widthwise extending aperture 24 in the yoke 12, so that the wiper can pivot freely but without excessive play about the pin 22. The centre portion 22a of the part of the pin that, in use, is located within the body of the superstructure 12 is of reduced diameter in known manner to form a curcumferential groove with two spaced facing annular shoulders, the groove receiving the spring latch member for retention of the pin in the aperture by abutment of the latch member against the shoulders.

Referring now also to the remaining figures the spring latch of this invention is formed from a single length of wire of suitable spring material, bent to have two parallel transversely-spaced lengthwise-extending side legs and a connecting widthwise-extending cross-piece 26 joining together two of the adjacent leg ends. Each leg comprises in the order stated, a heightwise-extending connection portion 28a immediately connected to the cross-piece 26, a lengthwise-extending pin-engaging portion 28b, a heightwise-extending spring portion 28c, a loop connecting portion 28d, a heightwise-extending reaction portion 28e and a turned lengthwise-extending end portion 28f. The junction of the two portions 28c and 28e takes the form of a smoothly-curved loop portion 28d with no specific demarkation between the three portions. The portions 28b through 28f are accomodated in a recess 30a through 30d formed in the underside of the superstructure, i.e. the side that in use faces the windshield, while the two parallel connecting portions 28a extend through an opening 32 that connects the recess with a counter-recess 34 extending from the superstructure front face. The opening 32 is of reduced length compared to the recesses 30a–30d and 34 to the extent that it will only just freely allow the portions 28a to move therethrough for a reason described below. For convenience in description the recess 30 may be considered as subdivided into a portion 30a surrounding or enclosing the connection portions 28a, a portion 30b enclosing the pin-engaging portion 28b, a portion 30c enclosing the portions 28c through 28e, and two small terminating portions 30d branching from the portion 30c and into which respective end portions 28f extend. This recess 30a–30d is of course formed by a single operation in the moulding of the superstructure primary yoke member.

The recess portion 30c has therein two downwardly tapered side wall pillars 36 protruding from the recess wall that extend heightwise from the superstructure underside to just short of the superstructure top side. Each pillar end adjacent the yoke top side is upwardly convex curved to conform with the curvature of the spring loop portion 28d and also has therein a recess 38 of curvature to just receive therein the spring wire (see FIG. 3). To assemble the spring connector into the yoke, all that is required is to insert it into the recess and push it home, and such an assembly step can be performed by a machine. Thus, the wire portions 28 and 20d first enter the recess portions 30a and 30c respectively, but to permit this the loop portions must be squeezed together until they can pass between the two pillars 36. The pin-engaging portions 28b must then be squeezed together to permit them to pass between two longitudinally-spaced side wall pillars 40 and 42 protruding from the recess wall at each end of the recess portion 30b and on opposite sides of the aperture 24. When the loop portions reach the ends of the pillars 36 they snap outwards and eventually engage in the recesses 38 so as to be securely retained in the required outwards position during subsequent manipulation of the latch. In the embodiment the outward movement of the loop portions into the recesses 38 is facilitated by the engagement of the end portions 28f in their respective end recesses 30d, so that the ends are held apart and thus serve as reaction members. In other embodiments these end members may not be required.

The final assembly position is shown in broken lines in FIG. 4, and it will be seen that the top of the cross member 26 is just flush with the top surface of the superstructure. It will also be noted that the pin-engaging wire portions 28b also engage a heightwise-extending transverse projection 44 in the top side wall of the recess portion 30b. The end of the pin 22 that enters the aperture 24 is tapered in known manner to automatically move the spring latch member to the position shown in chain-dotted lines as the pin enters, and the height of this transverse projection 44 determines the broken-line position of the latch member, ensuring that it will function in this manner and not block entry of the pin.

As the pin moves into the position shown most clearly in FIG. 5, the pin engaging portions 28a snap into the circumferential recess 22a in the pin and lock it against withdrawal; at this time the spring latch will occupy the position shown in solid lines. The connector is released for withdrawal of the pin by the operator inserting a finger end, or a suitable tool, into the recess 34 and thereby moving the spring latch back to the position shown in chain-dotted lines against the resilience of the spring portion 28c and the reaction of the reaction portion 28e. Movement beyond this position is not normally practicable, unless the operator deliberately uses a tool that can pass through the small aperture 32, and this terminal position is such that the spring material is not in any way over-stressed, so that the spring will retain its set shape and elasticity indefinitely.

One difficulty always experienced in manufacturing when different parts are to be combined, as with the wire spring latch and the moulded plastic yoke of the invention, is to take account of normal manufacturing variations that occur when the parts are finally produced and assembled. Thus, even with skilfull set-up of the wire-forming machine, using accurately-made forming tools, the resulting spring device can vary slightly but significantly from the designed shape. Again, despite accurate manufacture of the mould from which the plastic primary yoke is formed, there can be slight but significant variations in the recess 30 from the designed shape, so that during the first attempts to mount the spring in the recess it may not fit properly therein, or does not seat therein sufficiently accurately, in the required position. The mould and the wire forming machine must therefore be taken through the tedious process of "proving" involving small adjustments until the desired combination is achieved.

This proving process is simplified considerably with the connector of the invention, and in practice need only involve the forming mould in the final, usually more tedious stages. Thus the engagement of the spring pin-engaging portions with the pin shoulders and the extent of their protrusion into the aperture 24, are relatively simply adjusted by machining of the mould to increase or decrease, as required, the heights of the pillars 36 and of the projection 44. This machining is a relatively simple matter, much simpler than would be involved in attempting to machine an entire wall surface, particularly since the protruding pillars and projection are more easily accessible to the forming tools employed. If inadvertently too much metal is removed from the mould wall, it is a comparatively simple matter to add the small amount of metal required and re-machine the part to the required dimension. Similarly, during movement of the pin engaging portions 28b they press outward against the columns 40 and 42 and it is a relatively simply and inexpensive matter to change the protrusion of one or both of these columns into the recess to obtain the desired action and the required close engagement with the shoulders of the pin circumferential recess 22a.

The structure of the embodiment of FIGS. 6 and 7 is essentially similar to that of the first-described embodiment, and the same reference number is used for similar parts. The principal difference is that the connecting portions 28a and the cross piece 26 of the spring latch member are accomodated entirely within the recess portion 302. Release of the latch member is accompanied solely by the insertion of a suitable tool, such as the blade of a screwdriver, through an aperture 46 which is elongated lengthwise of the superstructure and extends above the cross-piece 26. Such a structure may be preferred to avoid the presence of the relatively large aperture 34 and in circumstances in which it is anticipated that the latch will be operated only infrequently.

It will be seen therefore that we have provided a new windshield wiper connector of simple but effective design permitting rapid and inexpensive manufacture and assembly, and also permitting rapid and relatively inexpensive forming of the device to its final desired form. The spring latch is contained wholly within the profile of the primary yoke to give the required low silhouette, and can easily be protected against overstress either during assembly and subsequent use. The movement to unlatch is downward, and this is inherently much easier for the operator to perform, besides permitting one-handed operation when required.

More specifically, it will be seen that the spring is produced by simple bending without the need for coiling to produce the required spring action. Moreover, the relatively long pin-engaging portion 28b serves as a spring to absorb the shocks applied to the connecting pin 22 as the wiper moves back and forth, the long lengths nevertheless being adequately transversely supported by the respective columnar projections 40 and 42. Again, it is found that a quite narrow recess is required to accomodate the latch member, so that the width of the superstructure need not be increased, the principal determining factor being the distance between the two pin shoulders that are engaged by the respective latch arms.

It will also be observed that, except for the side pin receiving aperture 24, the recesses can be formed by a mould whose parts open and close with a straight-line motion, since there are no undercut portions. In addition to the problems of dimensional stability and manufacturing tolerances discussed above many high strength materials that are now being employed, such as glass-filled polyesters, are subject to non-specific shrinkage that can only be determined by the final proving procedure, and this is facilitated by the present invention, as described above.

I claim:

1. A windshield wiper comprising:
   a pressure distributing superstructure having at least a yoke member thereof of moulded plastic material;
   the windshield wiper being of the type wherein a releasable connector between the superstructure and a wiper arm includes a pin extending sideways from the wiper arm and entering a cooperating transverse aperture in the said yoke member for the superstructure to pivot, the pin having a circumferential groove therein for releasable retaining engagement by a connector latch member mounted in an underside recess formed in the said yoke member;
   wherein said underside recess is moulded in the underside of the yoke member and communicates through an aperture of reduced length with a counter recess moulded in the topside of the yoke member;
   wherein a connector latch member is of spring wire material having two parallel transversely-spaced arms connected together at one end by a cross-member, which cross-member when the latch member is mounted in the yoke member is disposed in said counter-recess;
   each arm comprising a number of arm portions connected together in the following order, namely,
   a connecting portion connected to the said cross-member and extending from the counter-recess through the reduced length aperture into the said underside recess,
   a pin-engaging portion connected to the connecting portion and extending lengthwise of the yoke member for releasable retaining engagement in the circumferential pin groove and for heightwise movement into and out of such engagement by corresponding movement of the cross member and the connecting portion;
   a spring portion extending heightwise of the yoke member and flexing for said movement of the pin-engaging portion;
   and a spring reaction portion also extending heightwise of the yoke member and engaging a wall of the underside recess to provide reaction for the said heightwise movement of the pin-engaging portion;
   wherein the latch member during its maximum upward and downward movements remains always within the side profile of the yoke member and the cross-member does not protrude from the counter aperture, and
   wherein the cross-member is moved downward within the counter aperture for releasable disengagement of the latch member pin-engaging portion from the said connector pin groove, the heightwise downward movement of the cross-member within the counter aperture until the cross-member enters the said aperture of reduced length being sufficient for the said releasable disengagement of the latch member and being insufficient to overstress the spring wire material of the latch member.

2. The invention of claim 1, wherein means for retaining the connector latch member in the underside recess comprise two facing heightwise-extending columns on opposite side walls of the underside recess and protruding into the underside recess; and wherein insertion of the spring latch member into the underside recess requires movement together of the said two spring portions to permit them to move heightwise between the columns, in the fully inserted position of the latch member at least the portions of the arms between the spring and reaction portions moving apart for engagement over the topside ends of the columns and consequent retention of the latch member in the underside recess.

3. The invention of claim 2, wherein the portions of the arms between the spring and reaction portions are smoothly curved and the topside ends of the columns are correspondingly curved to receive the respective curved portions.

4. The invention of claim 3, wherein the said topside ends of the columns have respective grooves therein for receipt of the said curved arm portions and their retention against transverse movement thereon.

5. The invention of claim 2, wherein each arm comprises a lengthwise extending end portion connected to the reaction portion and engaged in the said underside recess to provide spring reaction for movement apart of the two arm portions between the respective spring and reaction portions for engagement over the topside ends of the columns.

6. The invention of claim 1, wherein each pin-engaging portion engages in the extreme uppermost position of the said portion a moulded transverse projection extending lengthwise from the underside recess wall and protruding therefrom, the height of the projection being adjustable by adjustment of the corresponding mould by which the yoke member is moulded to determine the protrusion of the pin-engaging portions into the cooperating transverse aperture in the absence of the pin therefrom.

7. The invention of claim 1, wherein each pin-engaging portion engages in its heightwise movement in the underside recess two lengthwise spaced moulded columns protruding widthwise into the underside recess, the columns being disposed on opposite sides of the said cooperating transverse aperture and the widthwise thickness thereof being adjustable by adjustment of the corresponding mould by which the yoke member is moulded to determine the engagement of the pin-engaging portions with the shoulders of the pin circumferential recess.

8. The invention of claim 6, wherein each pin-engaging portion engages in its heightwise movement in the underside recess two lengthwise spaced moulded columns protruding widthwise into the underside recess, the columns being disposed on opposite sides of the said cooperating transverse aperture and the widthwise thickness thereof being adjustable by adjustment of the corresponding mould by which the yoke member is moulded to determine the engagement of the pin-engaging portions with the shoulders of the pin circumferential recess.

9. A windshield wiper comprising:

a pressure distributing superstructure having at least a yoke member thereof of moulded plastic material;

the windshield wiper being of the type wherein a releasable connector between the superstructure and a wiper arm includes a pin extending sideways from the wiper arm and entering a cooperating transverse aperture in the said yoke member for the superstructure to pivot, the pin having a circumferential groove therein for releasable retaining engagement by a connector latch member mounted in an underside recess formed in the said yoke member;

wherein said underside recess is moulded in the underside of the yoke member and communicates through an aperture of reduced length with a counter recess moulded in the topside of the yoke member;

wherein a connector latch member is of spring wire material having two parallel transversely-spaced arms connected together at one end by a cross-member, which cross-member when the latch member is mounted in the yoke member is disposed in said counter-recess;

each arm comprising a number of arm portions connected together in the following order, namely, a connecting portion connected to the said cross-member and extending from the counter-recess through the reduced length aperture into the said underside recess, a pin-engaging portion connected to the connecting portion and extending lengthwise of the yoke member for releasable retaining engagement in the circumferential pin groove and for heightwise movement into and out of such engagement by corresponding movement of the cross member and the connecting portion;

a spring portion extending heightwise of the yoke member and flexing for said movement of the pin-engaging portion;

and a spring reaction portion also extending heightwise of the yoke member and engaging a wall of the underside recess to provide reaction for the said heightwise movement of the pin-engaging portion;

wherein means for retaining the connector latch member in the underside recess comprise two facing heightwise-extending columns on opposite side walls of the underside recess and protruding into the underside recess; and wherein insertion of the spring latch member into the underside recess requires movement together of the said two spring portions to permit them to move heightwise between the columns, in the fully inserted position of the latch member at least the portions of the arms between the spring and reaction portions moving apart for engagement over the topside ends of the columns and consequent retention of the latch member in the underside recess.

10. The invention of claim 9, wherein the portions of the arms between the spring and reaction portions are smoothly curved and the topside ends of the columns are correspondingly curved to receive the respective curved portions.

11. The invention of claim 10, wherein the said topside ends of the columns have respective grooves therein for receipt of the said curved arm portions and their retention against transverse movement thereon.

12. The invention of claim 9, wherein each arm comprises a lengthwise end portion connected to the reaction portion and engaged in the said underside recess to provide spring reaction for movement apart of the two arm portions between the respective spring and reaction portions for engagement over the topside ends of the columns.

13. The invention of claim 9, wherein each pin-engaging portion engages in the extreme uppermost position of the said portion a moulded transverse projection extending lengthwise from the underside recess wall and protruding therefrom, the height of the projection being adjustable by adjustment of the corresponding mould by which the yoke member is moulded to determine the protrusion of the pin-engaging portions into the cooperating transverse aperture in the absence of the pin therefrom.

14. The invention of claim 9, wherein each pin-engaging portion engages in its heightwise movement in the underside recess two lengthwise spaced moulded columns protruding widthwise into the underside recess, the columns being disposed on opposite sides of the said cooperating transverse aperture and the widthwise thickness thereof being adjustable by adjustment of the corresponding mould by which the yoke member is moulded to determine the engagement of the pin-engaging portions with the shoulders of the pin circumferential recess.

15. The invention of claim 13, wherein each pin-engaging portion engages in its heightwise movement in the underside recess two lengthwise spaced moulded columns protruding widthwise into the underside recess, the columns being disposed on opposite sides of the said cooperating transverse aperture and the widthwise thickness thereof being adjustable by adjustment of the corresponding mould by which the yoke member is moulded to determine the engagement of the pin-engaging portions with the shoulders of the pin circumferential recess.

16. A windshield wiper comprising:
 a pressure distributing superstructure having at least a yoke member thereof of moulded plastic material;
 the windshield wiper being of the type wherein a releasable connector between the superstructure and a wiper arm includes a pin extending sideways from the wiper arm and entering a cooperating transverse aperture in the said yoke member for the superstructure to pivot, the pin having a circumferential groove therein for releasable retaining engagement by a connector latch member mounted in an underside recess formed in the said yoke member;
 wherein said underside recess is moulded in the underside of the yoke member and communicates through an aperture of reduced length with a counter recess moulded in the topside of the yoke member;
 wherein a connector latch member is of spring wire material having two parallel transversely-spaced arms connected together at one end by a cross-member, which cross-member when the latch member is mounted in the yoke member is disposed in said counter-recess;
 each arm comprising a number of arm portions connected together in the following order, namely,
 a connecting portion connected to the said cross-member and extending from the counter-recess through the reduced length aperture into the said underside recess,
 a pin-engaging portion connected to the connecting portion and extending lengthwise of the yoke member for releasable retaining engagement in the circumferential pin groove and for heightwise movement into and out of such engagement by corresponding movement of the cross member and the connecting portion;
 a spring portion extending heightwise of the yoke member and flexing for said movement of the pin-engaging portion;
 and a spring reaction portion also extending heightwise of the yoke member and engaging a wall of the underside recess to provide reaction for the said heightwise movement of the pin-engaging portion;
 wherein each pin-engaging portion engages in the extreme uppermost position of the said portion a moulded transverse projection extending lengthwise from the underside recess wall and protruding therefrom, the height of the projection being adjustable by adjustment of the corresponding mould by which the yoke member is moulded to determine the protrusion of the pin-engaging portions into the cooperating transverse aperture in the absence of the pin therefrom.

17. The invention of claim 16, wherein each pin-engaging portion engages in its heightwise movement in the underside recess two lengthwise spaced moulded columns protruding widthwise into the underside recess, the columns being disposed on opposite sides of the said cooperating transverse aperture and the widthwise thickness thereof being adjustable by adjustment of the corresponding mould by which the yoke member is moulded to determine the engagement of the pin-engaging portions with the shoulders of the pin circumferential recess.

18. A windshield wiper comprising:
 a pressure distributing superstructure having at least a yoke member thereof of moulded plastic material;
 the windshield wiper being of the type wherein a releasable connector between the superstructure and a wiper arm includes a pin extending sideways from the wiper arm and entering a cooperating transverse aperture in the said yoke member for the superstructure to pivot thereon, the pin having a circumferential groove therein for releasable retaining engagement by a connector latch member mounted in an underside recess formed in the said yoke member;
 wherein said underside recess is moulded in the underside of the yoke member;
 wherein a connector latch member is of spring wire material having two parallel transversely-spaced arms connected together at one end by a cross-member;
 each arm comprising a number of arm portions connected together in the following order, namely;
 a connecting portion connected to the connecting portion and extending lengthwise of the yoke member for releasable retaining engagement in the circumferential pin groove and for heightwise movement into and out of such engagement by corresponding movement of the cross member and the connecting portion;
 a spring portion extending heightwise of the yoke member and enabling the said movement of the pin-engaging portion;
 and a spring reaction portion also extending heightwise of the yoke member and engaging a wall of the underside recess to provide reaction for the said heightwise movement of the pin-engaging portion;

wherein each pin-engaging portion engages in its heightwise movement in the underside recess two lengthwise spaced moulded columns protruding widthwise into the underside recess the columns being disposed on opposite sides of the said cooperating transverse aperture and the widthwise thickness thereof being adjustable by adjustment of the corresponding mould by which the yoke member is moulded to determine the engagement of the pin-engaging portions with the shoulders of the pin circumferential recess.

* * * * *